United States Patent [19]
Beecroft

[11] Patent Number: 5,392,175
[45] Date of Patent: Feb. 21, 1995

[54] PCMCIA TYPE HDD CONNECTOR MOUNT

[75] Inventor: Harold Beecroft, Colorado Springs, Colo.

[73] Assignee: Maxtor Corporation, San Jose, Calif.

[21] Appl. No.: 74,291

[22] Filed: Jun. 9, 1993

[51] Int. Cl.⁶ .......................................... G11B 17/00
[52] U.S. Cl. .................................................. 360/97.01
[58] Field of Search ................. 360/78.4, 97.01, 97.02, 360/99.06–99.12

[56] References Cited

U.S. PATENT DOCUMENTS

| | | | |
|---|---|---|---|
| 4,965,684 | 10/1990 | Stefansky | 360/97.01 X |
| 5,243,495 | 9/1993 | Read et al. | 360/97.01 X |
| 5,264,975 | 11/1993 | Bajorek et al. | 360/97.01 |
| 5,274,288 | 12/1993 | Stefansky | 360/98.07 X |

*Primary Examiner*—John H. Wolff
*Attorney, Agent, or Firm*—Blakely, Sokoloff, Taylor & Zafman

[57] ABSTRACT

A hard disk drive which contains a connector that is mounted to a printed circuit board and fixed in place by features in the base plate and cover of the disk drive housing. The base plate and cover each have a pair of arms that have steps located at an inner portion of the arms. The connector has a pair of ears that correspond in shape to the arms of the plates. The ears and arms cooperate to prevent the connector from moving away from the housing of the drive unit. Additionally, the connector housing is located between the outer portion of the arms in a manner to prevent lateral movement of the connector relative to the circuit board. The base plate and cover also have inclined steps which extend along the width of the drive unit and cooperate with the connector to prevent z-axis movement of the same.

10 Claims, 2 Drawing Sheets

PCMCIA TYPE HDD CONNECTOR MOUNT

BACKGROUND OF THE INVENTION

1. Field of the Invention

The present invention relates to hard disk drive assembly.

2. Description of Related Art

Most computer systems include a massive memory storage device such as a hard disk drive. Hard disk drive units contain a magnetic disk that is rotated by a spin motor. The drive unit also has a head that magnetizes and senses the magnetic field of the disk. The head is typically located at the end of an actuator arm which can move relative to the magnetic disk. The actuator arm, motor and other components of a typical disk drive unit are relatively small and fragile, and are therefore susceptible to damage when subjected to excessive external loads or vibration. For this reason, hard disk drives are usually rigidly mounted to the housing of the computer system by screws or other fastening means.

Hard disk drives contain programs and other information that are vital to the user. It is sometimes desirable to transfer such information to a different computer system. Transferring programs from a hard disk typically requires loading the information onto a floppy disk, or sending such information over a phone line. Such methods can be time consuming, particularly if the program is long or there is a large amount of data. There have been developed portable hard disk drives which can be plugged into a slot in the computer. To reduce the amount of possible component damage to the drive unit, the housing and assembly are typically constructed to be quite rugged. These rugged assemblies are heavy and bulky, and generally impractical to carry and store.

The Personal Computer Memory Card International Association (PCMCIA) has promulgated specifications for portable memory cards which can be plugged into slots within a computer. The PCMCIA standard includes a type I format, a type II format and a type III format, each format being distinguished by a different card thickness. Memory can be added to a computer by merely plugging in an additional card. Similarly, a modem or facsimile (FAX) card can be added to a system with the push of the hand. The standardized format of the cards allows a user to plug the memory card of one computer into another computer regardless of the type or make of either system.

The standardized cards are approximately the size of a credit card and include a connector which mates with a connector in the computer. The assignee of the present application has developed hard disk drive units which meet the type III format of the PCMCIA standard. The type III disk drives typically mount the connector to a printed circuit board within the housing of the drive unit, by soldering the leads of the connector to surface pads on the circuit board. Any relative movement between the connector and the circuit board will induce stress in the leads. Such movement may occur when the drive unit is inserted and removed from the host computer. Repeated insertions may cause the solder joints and leads to fatigue and break, thereby rendering the disk drive inoperable. The structural integrity of the solder leads can be improved by mounting the connector to the printed circuit board with screws. Requiring screws increases the assembly time and cost of the drive unit, particularly screws small enough to meet the height requirements of the PCMCIA Standard. It would be desirable to have a PCMCIA type disk drive which has a connector that is rigidly mounted to the printed circuit board without using any fasteners.

SUMMARY OF THE INVENTION

The present invention is a hard disk drive which contains a connector that is mounted to a printed circuit board and fixed in place by features in the base plate and cover of the disk drive housing. The base plate and cover each have a pair of arms that have steps located at an inner portion of the arms. The connector has a pair of ears that correspond in shape to the arms of the plates. The ears and arms cooperate to prevent the connector from moving away from the housing of the drive unit. Additionally, the connector housing is located between the outer portion of the arms in a manner to prevent lateral movement of the connector relative to the circuit board. The base plate and cover also have inclined steps which extend along the width of the drive unit and cooperate with the connector to prevent z-axis movement perpendicular to the plane of the base plate and cover.

Therefore it is an object of the present invention to provide a hard disk drive assembly which has a connector that is rigidly mounted to a printed circuit board without using fasteners.

It is also an object of the present invention to provide a hard disk drive assembly which has a connector that is rigidly mounted to a printed circuit board and which allows the circuit board to move relative to the housing, particularly when subjected to a thermal load that may cause the board to expand or shrink at a different rate than the housing.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
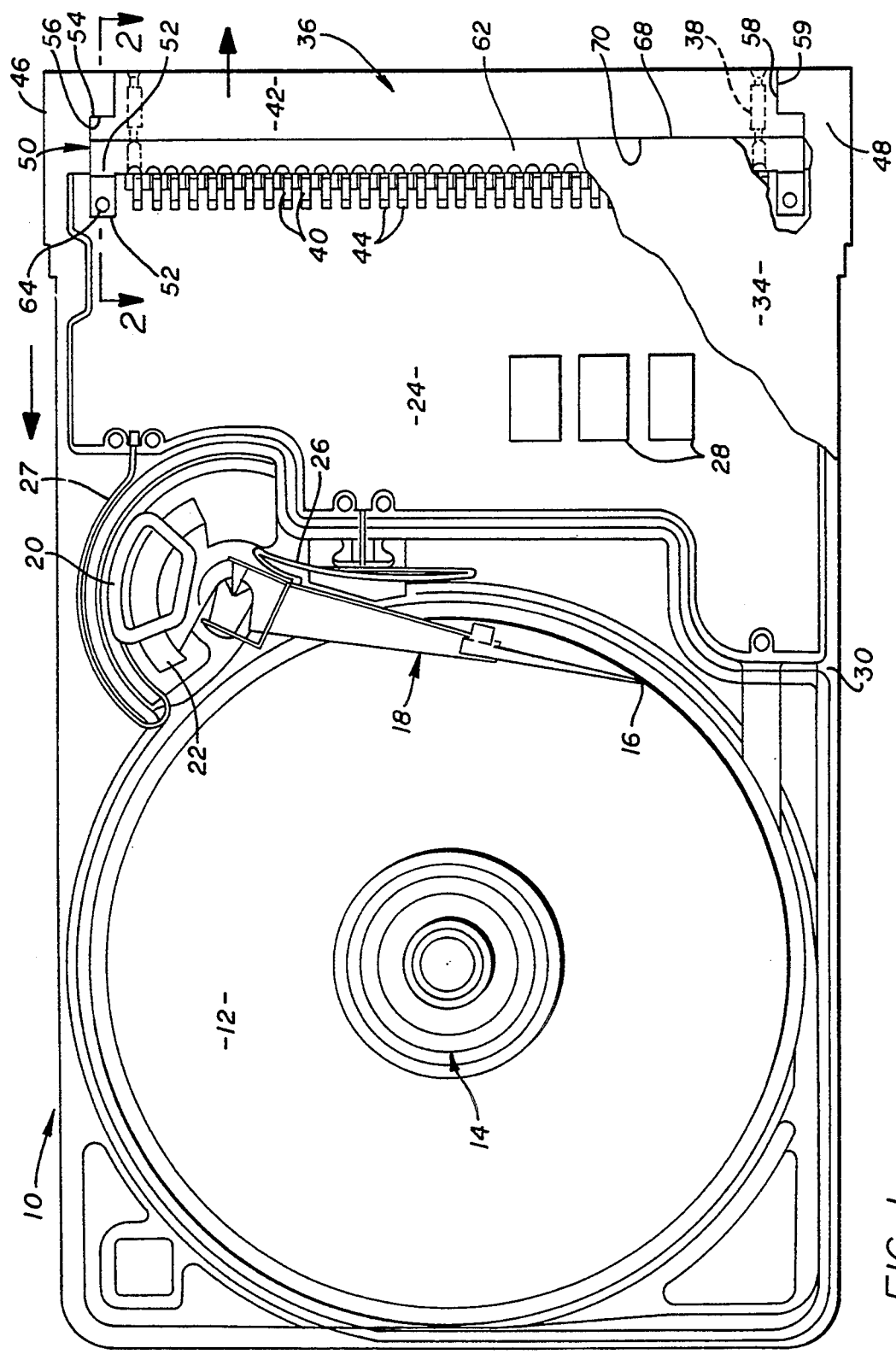
FIG. 1 is a top sectional view of a hard disk drive that has a connector located within a housing and mounted to a printed circuit board of the drive.
Figure 2:
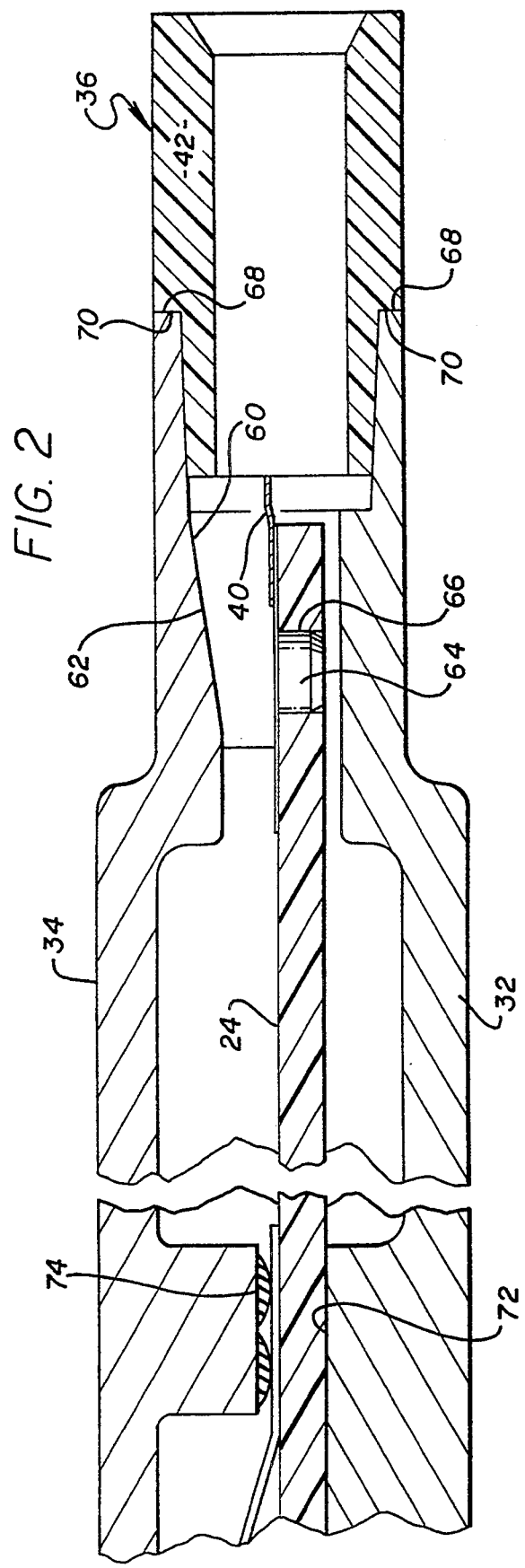
FIG. 2 is a cross-sectional view taken at line 2—2 of FIG. 1.

Referring to the drawings more particularly by reference numbers, FIGS. 1 and 2 show a hard disk drive 10 of the present invention. The disk drive assembly 10 has a magnetic disk 12 that is coupled to a spin motor 14. The spin motor 14 rotates the disk 12 relative to a magnetic head 16 that is mounted on the end of an actuator arm assembly 18. The actuator arm assembly 18 includes a voice coil 20 that is coupled to a magnet 22, which together move the actuator arm relative to the disk 12. The magnetic head 16 and voice coil 20 are coupled to a printed circuit board 24 by a flexible circuit boards 26 and 27, respectively. Mounted to the printed circuit board 24 are a plurality of electronic devices 28 that are used to control the operation of the drive unit.

The disk 12, actuator arm assembly 18 and printed circuit board 24 are all enclosed within a housing 30. As shown in FIG. 2 the housing includes a cover plate 34 and a base plate 32. In the preferred embodiment, the housing has the dimensions of 85.6×54.0×5.0 millimeters. The dimensions conform with the specifications issued by the Personal Computer Memory Card International Association (PCMCIA) for a type II electronic card. The PCMCIA is an association that has promulgated a specification which list dimensions and other requirements for a standard electronic card. Each computer that conforms with the PCMCIA specification will contain slots that can receive a standardized card. With such a standard, electronic cards of one computer can be readily plugged into another computer, regardless of the model or make of the computers.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a mortarboard to provide an interconnect to the computer system.

The disk drive 10 has a connector 36 which can mate with a corresponding connector within the host computer. The connector preferably has 68 pins and is typically of the pin and socket variety, commonly referred to as a pin connector. In the preferred embodiment, the pin connector 36 has a plurality of sockets 38 which each have a tail 40 that extends from the housing 42 of the connector 36. The tails 40 are soldered to surface pads 44 on the printed circuit board 24 to provide an electrical path between the electronic devices 28 and the host computer.

The base plate 32 and cover plate 34 have a pair of first arms 46 and second arms 48, respectively. Each arm has a step 50 located adjacent to the printed circuit board 24. The connector has a pair of ears 52 that conform to the shape of the steps 50 and are adjacent to the arms of the plates 32 and 34. The ears 52 have an outer surface 54 that can engage a corresponding inner surface 56 of the arms to prevent movement of the connector 36 away from the printed circuit board 24. The plates are also constructed so that surfaces 58 of the arms can engage the outer surface 59 of the connector housing 42 to prevent lateral movement of the connector 36 relative to the baseplate 32 and cover 34. The base plate 32 and cover 34 have surfaces 68 that engage surfaces 70 of the connector 36 to prevent the connector 36 from moving relative to the circuit board 24 when the disk drive is inserted into the connector of the host computer.

As shown in FIG. 2, the base 32 and cover 34 plates each have steps 60 that extend across the width of the housing 30 between the arms of the plates. The connector housing 42 has corresponding steps 62 which are captured by the step portions 60 of the plates. The steps 60 and 62 prevent z axis movement of the connector 36 relative to the circuit board 24. In the preferred embodiment, the ears 52 of the connector and steps 60 of the plates 32 and 34 have inclined surfaces 64. The ears 52 also have pins 64 that extend into apertures 66 in the printed circuit board 24. The pins 646 align the solder tails 40 to the surface pads 44 of the board 24. One of the pins has two opposite flat surfaces that allows the pin to move within the aperture. The clearance between the pin and aperture compensates for tolerances in the assembly.

The circuit board 24 is clamped to a step 72 of the base plate 32 by an elastomeric member 74 that extends from the cover plate 34. The elastomeric member 74 allows the circuit board 24 to move relative to the plates 32 and 34. Thus when the disk drive is subjected to a thermal load, the circuit board is allowed to shrink or expand independently of the plates so that the solder tails are not strained. The disk drive can accommodate thermal cycles between −60° F. and 300° F.

The engaging surfaces of the connector 36 and housing 30 prevent any relative movement between the connector 36 and the printed circuit board 24, thereby minimizing the stress on the solder tails 40 during the insertion and removal of the disk drive into a host PCMCIA socket. This is accomplished by the present invention without the use of screws, pins or any other fastening means. The connector mount of the disk drive 10 is therefore simple to assemble and less costly to produce than drives in the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:
    a base plate having a pair of first arms at a connector end of said plate, said first arms each having a first ear step;
    a cover plate having a pair of second arms at a connector end of said plate, said second arms each having a second ear step;
    a magnetic disk enclosed by said cover plate and said base plate;
    an actuator arm assembly enclosed by said cover plate and said base plate;
    a printed circuit board enclosed by said cover plate and said base plate; and,
    a connector coupled to said printed circuit board, said connector having outer edges that cooperate with said arms of said base plate and said cover plate and prevent movement of said connector in a first direction, said connector also having a pair of ears that cooperate with said first and second ear steps of said arms and prevent movement of said connector in a second direction that is essentially perpendicular to the first direction.

2. The hard disk drive assembly as recited in claim 1, wherein said base plate has a base step that is adjacent to a bottom surface of said connector and said cover plate has a cover step that cooperates with a top surface of said connector and prevent movement of said connector in a third direction that is essentially perpendicular to the first direction.

3. The hard disk drive assembly as recited in claim 1, wherein said cover step has an inclined surface that is adjacent to inclined surfaces of said connector ears.

4. The hard disk drive assembly as recited in claim 1, wherein said connector ears each have a pin that extends into a corresponding aperture in said printed circuit board.

5. The hard disk drive assembly as recited in claim 1, wherein said connector has a plurality of solder tails that are connected to said printed circuit board.

6. A hard disk drive assembly, comprising:

a base plate having a pair of first arms at a connector end of said plate, said connector end having a base step extending between said first arms;

a cover plate having a pair of second arms at a connector end of said plate, said connector end having a cover step between said second arms;

a magnetic disk enclosed by said cover plate and said base plate;

an actuator arm assembly enclosed by said cover plate and said base plate;

a printed circuit board enclosed by said cover plate and said base plate; and, a connector coupled to said printed circuit board, said connector having outer edges that cooperate with said arms of said base plate and said cover plate to prevent movement of said connector in a first direction, said connector also having a bottom surface that cooperates with said base step of said base plate and a top surface that cooperates with said cover step of said cover plate to prevent movement of said connector in a second direction that is essentially perpendicular to the first direction.

7. The hard disk drive assembly as recited in claim 6, wherein said first and second arms each have a step that cooperates with a pair of ears that extend from said connector to prevent movement of said connector in a third direction that is essentially perpendicular to the first direction.

8. The hard disk drive assembly as recited in claim 7, wherein said cover step has an inclined surface that is adjacent to inclined surfaces of said connector ears.

9. The hard disk drive assembly as recited in claim 8, wherein said connector ears each have a pin that extends into a corresponding aperture in said printed circuit board.

10. The hard disk drive assembly as recited in claim 9, wherein said connector has a plurality of solder tails that are connected to said printed circuit board.

* * * * *